United States Patent
Sheng (10) Patent No.: US 12,543,957 B1
(45) Date of Patent: Feb. 10, 2026

(54) ENCODED PHOTOACOUSTIC TOMOGRAPHY

(71) Applicant: Laminar Digital Health, Inc, Sunnyvale, CA (US)

(72) Inventor: Samuel W. Sheng, Saratoga, CA (US)

(73) Assignee: Laminar Digital Health, Inc, Sunnyvale, CA (US)

( * ) Notice: Subject to any disclaimer, the term of this patent is extended or adjusted under 35 U.S.C. 154(b) by 269 days.

(21) Appl. No.: 17/871,465

(22) Filed: Jul. 22, 2022

Related U.S. Application Data (60) Provisional application No. 63/225,329, filed on Jul. 23, 2021.

(51) Int. Cl.
*A61B 5/00* (2006.01)
*A61B 5/021* (2006.01)
*A61B 5/145* (2006.01)

(52) U.S. Cl.
CPC ............ *A61B 5/0095* (2013.01); *A61B 5/021* (2013.01); *A61B 5/14532* (2013.01); *A61B 5/681* (2013.01); *A61B 2562/0204* (2013.01)

(58) Field of Classification Search
CPC .... A61B 5/021; A61B 5/0095; A61B 5/14532
See application file for complete search history.

(56) References Cited

U.S. PATENT DOCUMENTS

| | | | | |
|---|---|---|---|---|
| 2003/0167002 A1* | 9/2003 | Nagar | ................. | A61B 5/1455 600/437 |
| 2005/0069315 A1* | 3/2005 | Therisod | ............. | H04B 10/564 398/33 |
| 2006/0264717 A1* | 11/2006 | Pesach | ............... | G01N 29/4427 600/310 |
| 2010/0081912 A1* | 4/2010 | McKenna | ............ | A61B 5/1455 600/368 |
| 2013/0109947 A1* | 5/2013 | Wood | ..................... | A61B 5/021 600/407 |
| 2019/0377962 A1* | 12/2019 | Kitchens | ............... | A61B 5/0095 |
| 2022/0192524 A1* | 6/2022 | Leabman | ............... | A61B 5/681 |

* cited by examiner

*Primary Examiner* — Christopher Koharski
*Assistant Examiner* — Helene Bor
(74) *Attorney, Agent, or Firm* — Van Pelt, Yi & James LLP (57) ABSTRACT

A system and method for performing photoacoustic tomography is provided. Encoded light modulated using one or more digital encoding sequences is emitted using a plurality of light sources. Ultrasonic signals emitted by target biological tissues that absorbed at least a portion of the emitted encoded light are received using a plurality of receivers. The received ultrasonic signals are correlated using one or more reference signals encoded using the one or more digital encoding sequences to determine timing associated with the received ultrasonic signals. Locations associated with the target biological tissues are determined based on the determined timing.

20 Claims, 9 Drawing Sheets

ENCODED PHOTOACOUSTIC TOMOGRAPHY

CROSS REFERENCE TO OTHER APPLICATIONS

This application claims priority to U.S. Provisional Patent Application No. 63/225,329 entitled ENCODED PHOTOACOUSTIC TOMOGRAPHY USING LED ILLUMINATORS filed Jul. 23, 2021 which is incorporated herein by reference for all purposes.

BACKGROUND OF THE INVENTION

Medical imaging allows doctors and individuals to view internal features of a human body to detect or monitor functions of the human body as well as diagnose or treat diseases. Traditional x-ray imaging, Magnetic Resonance Imaging, or ultrasound imaging technologies require the use of large and expensive devices located in professional medical offices that make it difficult for an individual to make frequent use of the technology. There exists a need for technological solutions that enable lower cost, compact, and portable medical imaging devices.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Photoacoustic tomography is a form of in-body/in-tissue imaging that utilizes optical excitation to generate ultrasonic energy from an imaging target. A laser fires a short pulse (e.g., less than 10 nanoseconds (ns) in duration) into tissue being imaged. A wavelength of the laser can be chosen such that the photons will be extinguished and be absorbed on a specific target (e.g., 576 nm for oxygenated hemoglobin in blood). When the photons are absorbed, local heating occurs, causing rapid thermal expansion and contraction of the tissue. This thermal expansion and contraction cause an ultrasound pulse to launch from a point in the tissue where the photon was absorbed. An ultrasonic detector located outside of the tissue can detect the ultrasound pulse. The time-of-flight from the laser pulse to reception of the ultrasound wave can be used to compute the point of origination. Lasers are large, consume a great deal of power, and are dangerous to eyes because a laser beam can easily damage retinas.

In some embodiments, a system/method/computer program product for performing encoded photoacoustic tomography includes emitting, using a plurality of light sources, encoded light modulated using one or more digital encoding sequences; receiving, using a plurality of receivers, ultrasonic signals emitted by target biological tissues that absorbed at least a portion of the emitted encoded light; correlating the received ultrasonic signals using one or more reference signals encoded using the one or more digital encoding sequences to determine timing associated with the received ultrasonic signals; and determining locations associated with the target biological tissues based on the determined timing.

In some embodiments, the system/method/computer program product further includes determining blood pressure based on the determined locations.

In some embodiments, the encoded light has a wavelength in a range of 1420-1480 and 1630-1730 nm; and the method further includes determining glucose concentration of the target biological tissues based on the determined timing.

In some embodiments, the system/method/computer program product further includes determining a range of a diameter of a blood vessel of the target biological tissues based on the determined timing over a period of time.

In some embodiments, the system/method/computer program product further includes determining blood pressure based on the determined range of the diameter of the blood vessel.

In some embodiments, the plurality of light sources includes a plurality of vertical-cavity surface-emitting lasers (VCSELs).

In some embodiments, the plurality of light sources includes a plurality of light emitting diodes (LEDs).

In some embodiments, the one or more digital encoding sequences correspond to a pseudorandom binary sequence (PRBS).

In some embodiments, the plurality of receivers include a plurality of piezoelectric sensing devices or a plurality of microphones.

In some embodiments, the timing corresponds to a time relating to a speed of sound traveling from a target biological tissue to a receiver of the plurality of receivers.

Figure 1:
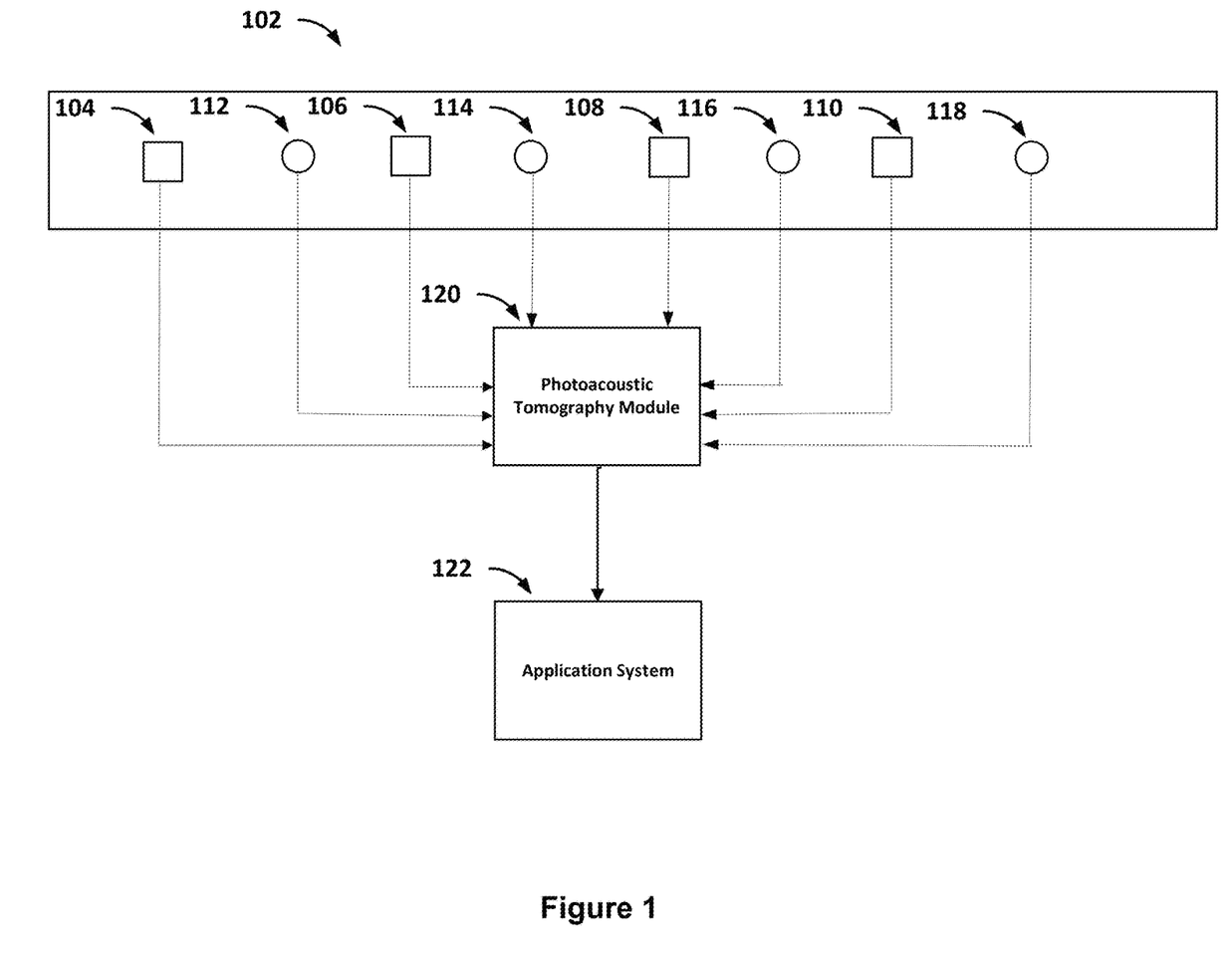
FIG. 1 is a block diagram illustrating an embodiment of a system for performing photoacoustic tomography.

FIG. 1 is a block diagram illustrating an embodiment of a system for performing photoacoustic tomography. In some embodiments, the system shown in FIG. 1 is included in medium 102, for example, a wrist-worn wearable device, similar to a watch, a chest-worn wearable device, similar to a chest band, a head-worn wearable device, similar to a head band, a leg-worn wearable device, similar to a leg band, and any other wearable device. Medium 102 is coupled to transmitters 104, 106, 108, and 110 and receivers/sensors 112, 114, 116, and 118. The locations where transmitters 104, 106, 108, and 110 and sensors 112, 114, 116, and 118 have been coupled to medium 102, as shown in FIG. 1, are merely an example. Other configurations of transmitter and sensor locations may exist in various embodiments. Although FIG. 1 shows sensors alternating with transmitters, the sensors may be grouped together apart from the transmitters in other embodiments. In some embodiments, a single transducer is used as both a transmitter and a sensor. In various embodiments, the medium 102 includes one or more of the following: plastic, leather, steel, metal, silicon, and any medium that is able to mount the transmitters and the sensors.

Examples of transmitters 104, 106, 108, and 110 include piezoelectric transducers, electromagnetic transducers, transmitters, sensors, and/or any other transmitters and transducers. Examples of sensors 112, 114, 116, and 118 include piezoelectric transducers, electromagnetic transducers, laser vibrometer transmitters, and/or any other sensors and transducers. In some embodiments, the transmitters and sensors shown in FIG. 1 are mounted on medium 102. Although four transmitters and four sensors are shown, any number of transmitters and any number of sensors may be used in other embodiments. For example, two transmitters and three sensors may be used. In some embodiments, a single transducer acts as both a transmitter and a sensor. For example, transmitter 104 and sensor 112 represent a single piezoelectric transducer. In the example shown, transmitters 104, 106, 108, and 110 each may be mounted on medium 102. A signal emitted by a transmitter is distinguishable from another signal emitted by another transmitter. In order to distinguish the signals, a phase of the signals (e.g., code division multiplexing), a frequency range of the signals (e.g., frequency division multiplexing), or a timing of the signals (e.g., time division multiplexing) may be varied. One or more of sensors 112, 114, 116, and 118 receive the propagated signals.

Photoacoustic tomography module 120 is connected to the transmitters and sensors shown in FIG. 1. In some embodiments, photoacoustic tomography module 120 includes one or more of the following: an integrated circuit chip, a printed circuit board, a processor, and other electrical components and connectors. Photoacoustic tomography module 120 determines and sends signals to be propagated by transmitters 104, 106, 108, and 110. Photoacoustic tomography module 120 also receives the signals detected by sensors 112, 114, 116, and 118. The received signals are processed by photoacoustic tomography module 120 to determine whether a disturbance associated with a blood vessel has been detected at a location in body tissue. Photoacoustic tomography module 120 is in communication with application system 122. Application system 122 uses information provided by photoacoustic tomography module 120. For example, application system 122 receives from photoacoustic tomography module 120 a coordinate associated with a blood vessel. In some embodiments, application system 122 includes a processor and/or memory/storage. In other embodiments, photoacoustic tomography module 120 and application system 122 are at least in part included/processed in a single processor. An example of data provided by photoacoustic tomography module 120 to application system 122 includes one or more of the following: a location associated with a blood vessel, glucose concentration in a blood vessel, and/or a diameter of a blood vessel.

Figure 2:
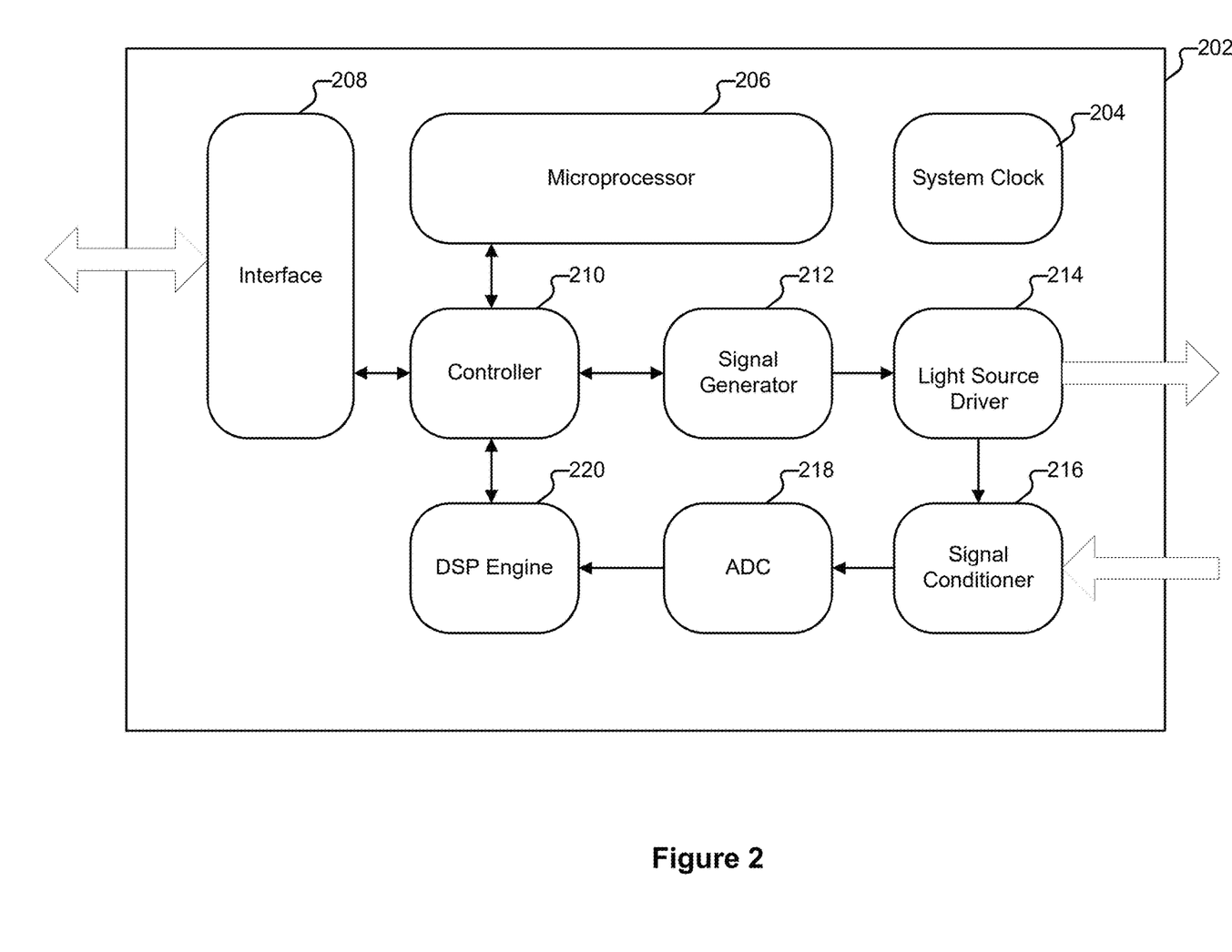
FIG. 2 is a block diagram illustrating an embodiment of a system for detecting an ultrasound pulse.

FIG. 2 is a block diagram illustrating an embodiment of a system for detecting an ultrasound pulse. In some embodiments, ultrasound pulse detector 202 is included in photoacoustic tomography module 120 of FIG. 1. In some embodiments, the system of FIG. 2 is integrated in an integrated circuit chip. Photoacoustic tomography module 202 includes system clock 204 that provides a synchronous system time source to one or more other components of detector 202. Controller 210 controls data flow and/or commands between microprocessor 206, interface 208, DSP engine 220, and signal generator 212. In some embodiments, microprocessor 206 processes instructions and/or calculations that can be used to program software/firmware and/or process data of photoacoustic tomography module 202. In some embodiments, a memory is coupled to microprocessor 206 and is configured to provide microprocessor 206 with instructions. Signal generator 212 generates signals to be used to propagate signals such as signals propagated by transmitters 104, 106, 108, and 110 of FIG. 1. For example, signal generator 212 generates pseudorandom binary sequence signals that are converted from digital to analog signals. Different signals (e.g., a different signal for each transmitter) may be generated by signal generator 212 by varying a phase of the signals (e.g., code division multiplexing), a frequency range of the signals (e.g., frequency division multiplexing), or a timing of the signals (e.g., time division multiplexing). Light source driver 214 receives the signal from generator 212 and drives one or more transmitters, such as transmitters 104, 106, 108, and 110 of FIG. 1, to propagate signals through body tissue.

A signal detected from a sensor such as sensor 112 of FIG. 1 is received by photoacoustic tomography module 202 and signal conditioner 216 conditions (e.g., filters) the received analog signal for further processing. For example, signal conditioner 216 receives the signal outputted by light source driver 214 and performs echo cancellation of the signal received by signal conditioner 216. The conditioned signal is converted to a digital signal by analog-to-digital converter 218. The converted signal is processed by digital signal processor engine 220. For example, DSP engine 220 separates components corresponding to different signals propagated by different transmitters from the received signal and each component is correlated against a reference signal. The result of the correlation may be used by microprocessor 206 to determine a location associated with a blood vessel. For example, microprocessor 206 compares relative differences of disturbances detected in signals originating from different transmitters and/or received at different receivers/sensors in conjunction with a speed of sound through body tissue to determine the location. Interface 208 provides an interface for microprocessor 206 and controller 210 that allows an external component to access and/or control detector 202. For example, interface 208 allows detector 202 to communicate with application system 122 of FIG. 1 and provides the application system with location information associated with a blood vessel.

Figure 3:
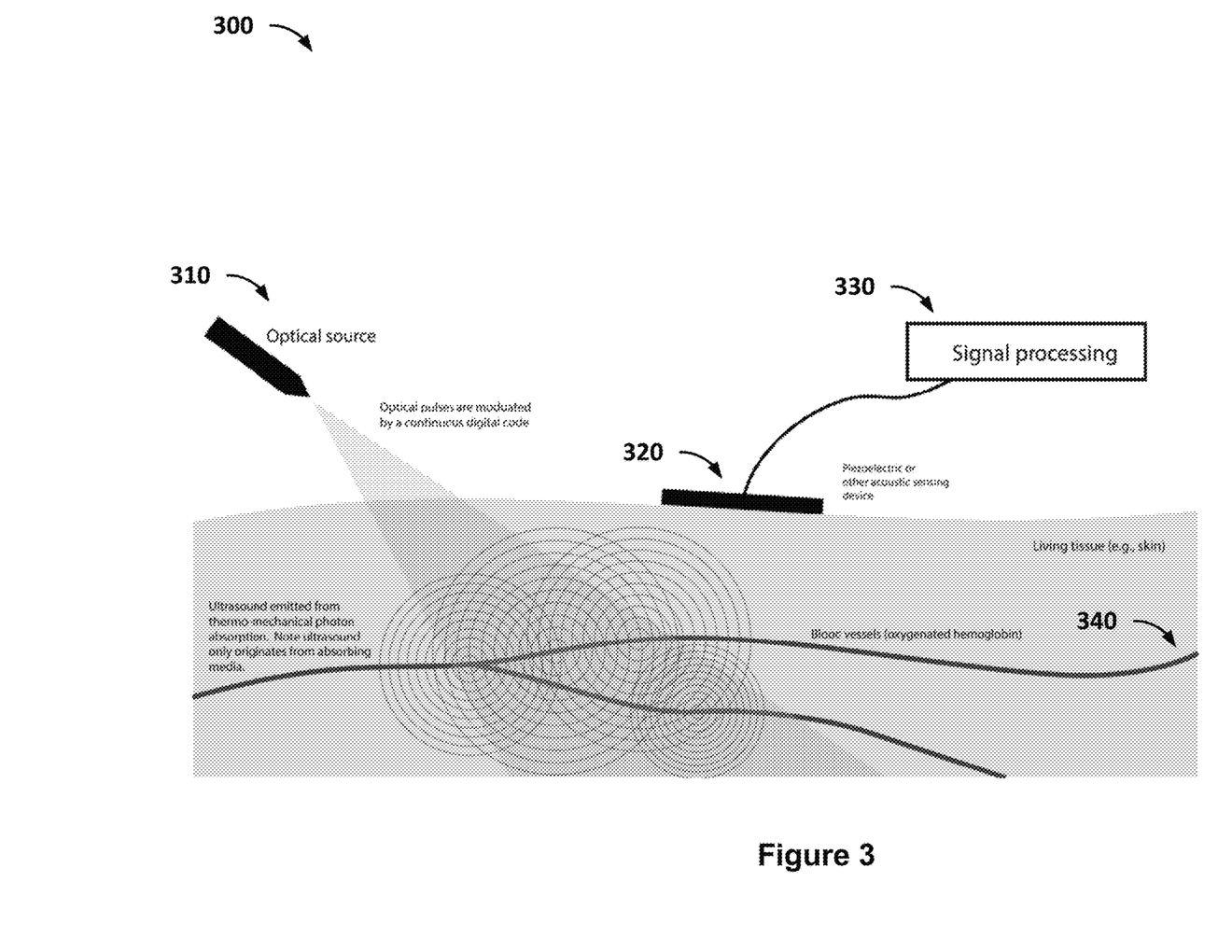
FIG. 3 is an example of an architecture for performing photoacoustic tomography using an optical source.

FIG. 3 is an example of an architecture for performing photoacoustic tomography using an optical source. In some embodiments, the architecture 300 includes an optical source 310, an ultrasonic detector 320, a signal processor 330, and a blood vessel 340.

In some embodiments, the optical source 310 is a laser that emits optical pulses modulated by a continuous digital code. The optical pulse allows for in-body/in-tissue imaging that utilizes optical excitation to generate ultrasonic energy from the imaging target. As shown in the example of FIG. 3, an optical source (e.g., a light-emitting diode (LED), laser, etc.) fires a short pulse (e.g., less than 10 nanoseconds in duration) into tissue desired to be imaged. The wavelength of the laser is chosen such that the photons will extinguish and be absorbed on a specific target (e.g., 576 nm, or a wavelength in a range of between 550-600 nm for oxygenated hemoglobin in blood; 1450 nm for glucose concentration in interstitial fluid, or a wavelength in a range of 1420-1480 and 1630-1730 nm for glucose concentration in interstitial fluid; etc.). When the photons are absorbed, local heating occurs in the tissue, causing rapid thermal expansion and contraction of the tissue. This thermal expansion and contraction of the tissue causes an ultrasound pulse to launch from the point where the photon was absorbed. The ultrasonic detector 320 (e.g., a piezoelectric, a microphone, or other acoustic sensing device 320) located outside of the tissue can detect and receive the ultrasound pulse. The time-of-flight from the laser pulse emission to reception of the ultrasound wave can be used to compute the point of origination based on a speed of sound through tissue using a signal processor 330. For example, a speed of sound traveling through body tissue is 1540 m/s, and after the time-of-flight is determined, the point of origination is determined based on the time-of-flight and the speed of sound (e.g., 1540 m/s) traveling through the body tissue. As an aspect, the entire sequence of ultrasound pulses can be then used to create an image of the tissue (e.g., in the case of oxygenated hemoglobin, an image of all of the blood vessels (e.g., a blood vessel 340) in the tissue).

In some embodiments, the ultrasonic detector 320 is a remote sensor, such as, for example, a microphone. The remote sensor can interface with air and is not required to be in direct contact with skin to detect ultrasonic signals.

For consumer devices, using a high-power, short-burst laser as the optical source 310 for in-tissue imaging is limited because of safety concerns, size issues, and power consumption. To address the safety concerns, size issues, and power consumption, the laser can be replaced with LEDs or low powered lasers, such as, vertical-cavity surface-emitting lasers (VCSELs) for the optical source 310. One issue with using an LED emission source is that the effective signal-to-noise ratio drops by nearly a factor of 100 (40 dB) as compared to a laser emission source because of a combination of lower photon intensity and incoherence.

In some embodiments, the optical source 310 corresponds with a transmitter 104, 106, 108, or 110 of FIG. 1. In some embodiments, the ultrasonic detector 320 corresponds with a receiver 112, 114, 116, or 118 of FIG. 1.

In some embodiments, to adjust for the lower photon intensity and the incoherence of the LED emission source, the LED emission source is modulated using a digital encoding scheme, for example, a pseudorandom binary sequence (PRBS). In some embodiments, the modulation of the LED emissions relates to a frequency of the light pulses emitted by the LED emission source. For example, the frequency of the light pulses is in a range 1-10 Megahertz (MHz) (or 0.1-1 microseconds/pulse emission), with the width (time duration) of each pulse emission in the range of 0.01 to 0.5 microseconds. In some embodiments, the LED light pulse repetition rate is slow enough to allow for thermal relaxation in the tissue after each pulse, and in the event that the frequency of the light pulses is too fast, thermal saturation can result with no ultrasonic emission occurring. In some embodiments, a repetition rate that meets the criteria, allowing for thermal relaxation without thermal saturation, is a range of around 10 MHz to as high as 100 MHz. In some embodiments, the pulses from the LED emission source are modulated using a digital code, which is then decoded by the ultrasonic receiver 320.

In some embodiments, the ultrasonic receiver 320 is designed as a comb-in-time module, which scans for correlation peaks of the received ultrasonic signal. In some embodiments, the received ultrasonic signal is processed by the signal processor 330 to obtain the correlation peaks, and an encoding of the correlation peaks are compared with the encoding of the light pulses emitted by the LED emission source. Based on the encoding comparisons, the signal processor 330 can determine whether a match of the encodings has occurred at a specific time resolution. In the event that the signal processor 330 determines that a match of the encodings has occurred, the signal processor 330 can determine the time that the corresponding light pulses were emitted and the time that the ultrasonic signal was received by the ultrasonic receiver 320 to obtain the time-of-flight. Based on time-of-flight of ultrasonic signals from a plurality of optical sources 310 and the speed of sound traveling through body tissue, a blood vessel location can be determined and target tissue can be imaged. For example, if the time-of-flight is 1000 ns and the speed of sound is 1540 m/s, the distance of the blood vessel is 1.54 mm.

Upon determining distances from signals received from sensors, which relate to distances from corresponding sensors to a blood vessel, a location of the blood vessel is determined. For example, given a determined distance from a sensor to a blood vessel, possible locations of the blood vessel can be represented by a circle centered on the sensor with a radius of the determined distance. With a plurality of the sensors, each sensor having a corresponding circle representing the possible locations of the blood vessel, the point(s) of intersection of these circles (e.g., a location closest to highest number of circle intersections) is associated with the location of the blood vessel.

Because of the comb-in-time in conjunction with the coding gain of the digital modulation, the LED emission source replicates the high-intensity, short-time-burst nature of the laser, and compensates for the 100× loss in signal-to-noise ratio of the laser.

Figure 4:
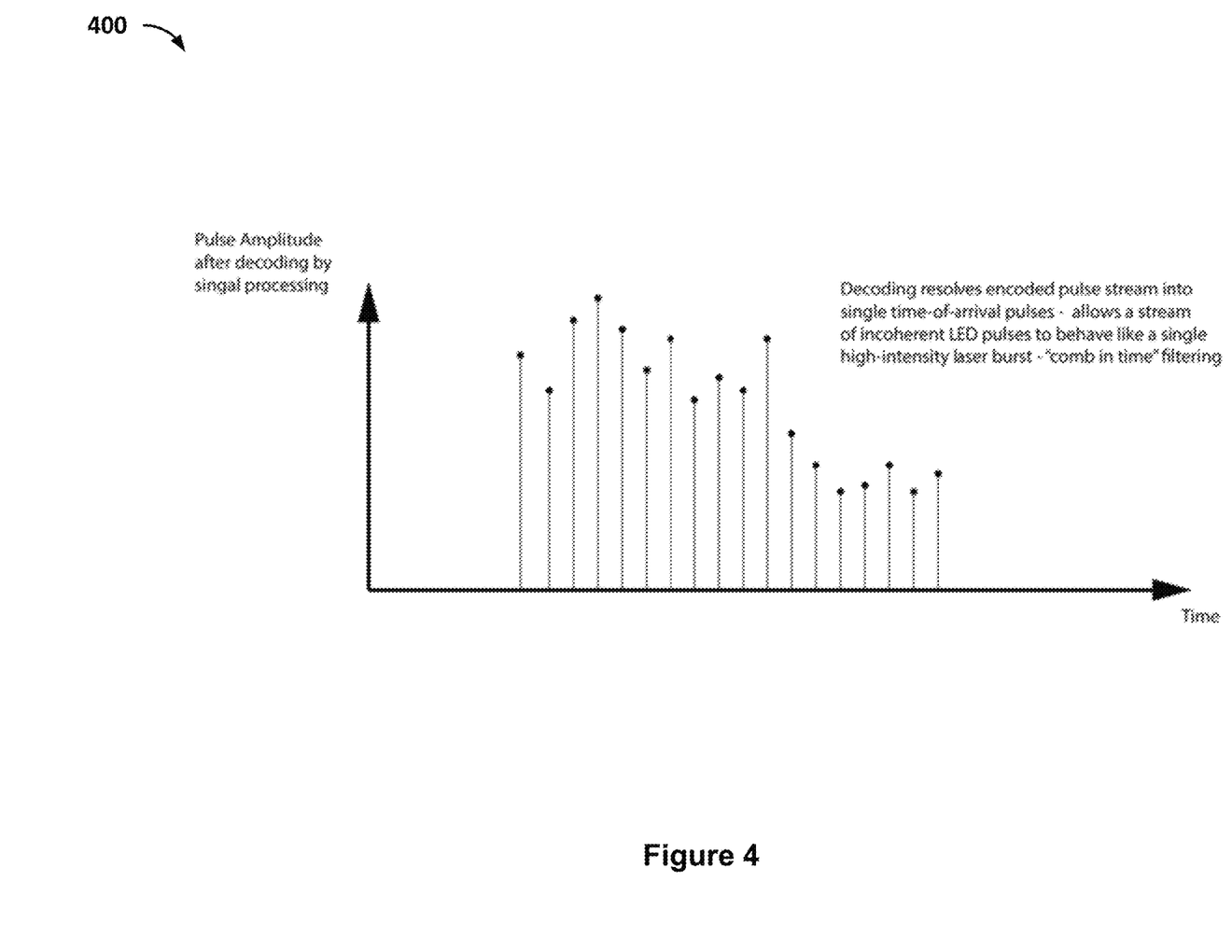
FIG. 4 is an example of a received photoacoustic signal.

FIG. 4 is an example of a received photoacoustic signal. In some embodiments, because the amplitude of each pulse of the light emission from the optical source of 310 of FIG. 3, an amplitude of the received photoacoustic signal corresponds with the amount of the received ultrasonic signal. For example, in the event that the amplitude of a first received photoacoustic signal is a multiple (e.g., 2×) of the amplitude of a second received photoacoustic signal, that indicates that the first received photoacoustic signal corresponds to a combination of two different received photoacoustic signals. In some embodiments, relative amplitude of various received photoacoustic signals indicate relative concentrations of a substance (e.g., glucose concentration) in a blood vessel. In some embodiments, after decoding, the resulting stream of a plurality of encoded pulses allows a stream of incoherent LED pulses to behave like a single laser burst-"comb in time" filtering.

Figure 5:
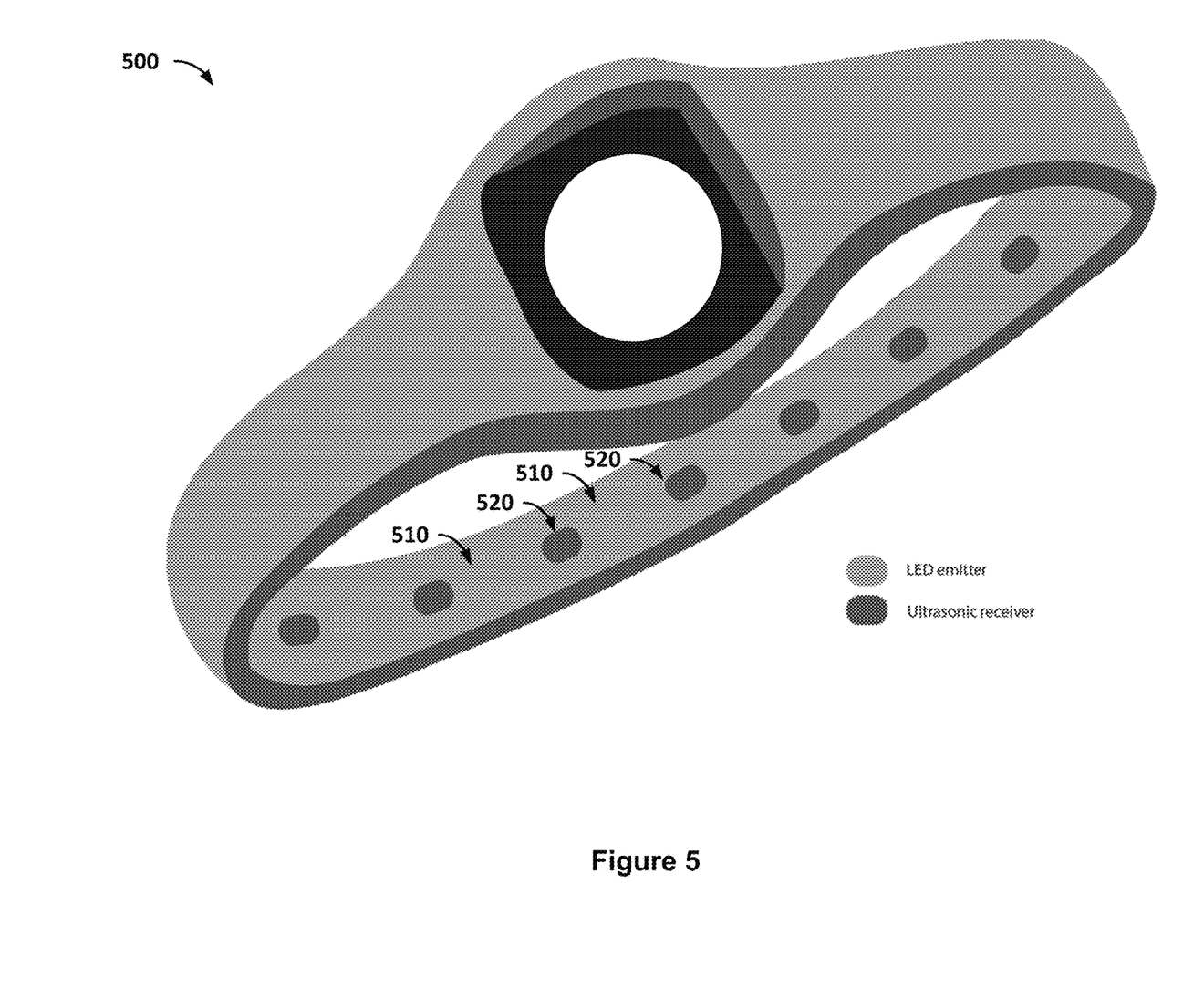
FIG. 5 is an embodiment of a device including a plurality of LED emitters and a plurality of ultrasonic receivers for performing photoacoustic tomography.

FIG. 5 is an embodiment of a device including a plurality of LED emitters and a plurality of ultrasonic receivers for performing photoacoustic tomography. In some embodiments, the device 500 is a wrist-worn wearable device, similar to a watch, and includes a plurality of LED emitters 510 and a plurality of ultrasonic receivers 520. In some embodiments, the device 500 is worn around the chest as a chest band. In some embodiments, the device 500 is worn around the head as a head band. In some embodiments, the device 500 is worn around a leg as a leg band. In some embodiments, the plurality of LED emitters 510 emit pulses of light, and the plurality of ultrasonic receivers 520 receive a corresponding photoacoustic signal. In some embodiments, the ultrasonic receivers 520 are piezoelectric sensing devices. In some embodiments, the ultrasonic receivers 520 are microphones. In some embodiments, the band of the wearable device 500 is embedded with a combination of the LED emitters 510 and the ultrasonic receivers 520, grouped in segments.

In some embodiments, the LED emitters 510 are fired in sequence around the wearable band of the device 500. By firing the LED emitters 510 in sequence, the entire wrist can be imaged in cross-section since shadowing can be algorithmically eliminated by knowing the illumination angle of each segment. For example, if one LED can illuminate only a portion of the wrist within its illumination angle, different LEDs positioned at different locations with its corresponding illumination angle are able to illuminate the entire wrist. In some embodiments, all of the LED emitters 510 are fired substantially simultaneously. By firing the LEDs substantially simultaneously (e.g., and synchronized to each other), a higher photon density can be achieved, as well as a faster imaging repetition rate than in the case where each segment is fired one at a time in sequence. In both the sequenced and substantially simultaneous emission modes, all of the ultrasonic receivers 520 can be employed with a comb-in-time module on each ultrasonic receiver 520 to provide a fine-time resolution measurement of the received photoacoustic signal.

In some embodiments, the plurality of LED emitters 510 correspond with the transmitters 104, 106, 108, and 110 of FIG. 1.

In some embodiments, the plurality of ultrasonic receivers 520 correspond with the receivers 112, 114, 116, and 118 of FIG. 1.

To perform photoacoustic tomography, the wavelength of the light emitted from each LED emitter 510 can be set to, e.g., 576 nm (or a wavelength in a range of 550-600 nm) to illuminate oxygenated hemoglobin in blood. Based on the received photoacoustic signals, an image of the tissue can be created, for example, a pattern of capillaries is imaged. In some embodiments, the pattern of capillaries corresponds with a biometric fingerprint.

To determine glucose concentration in blood vessels, the wavelength of the light emitted from each LED emitter 510 can be set to, e.g., 1450 nm to measure glucose concentration in interstitial fluids, or a wavelength in a range of 1420-1480 and 1630-1730 nm to measure glucose concentration in interstitial fluids. Based on the received photoacoustic signals, the glucose concentration in blood vessels can be measured based on the amplitude of the received photoacoustic signals.

To measure blood pressure, the wavelength of the light emitted from each LED emitter 510 can be set to, e.g., 576 nm (or a wavelength between 550-600 nm) to illuminate body tissue. Based on the received photoacoustic signals, changes in the diameter of a blood vessel can be measured to correspond with the systole and diastole of a blood pressure measurement.

To determine whether blood vessels have become stiff, e.g., sclerotic, based on the received photoacoustic signals, a deviation of the diameter of a blood vessel can be measured whether deviation is smaller than normal. For example, the deviation of the blood vessel is compared to a normal blood vessel deviation threshold, and in the event that the deviation of the blood vessel is smaller than or equal to the normal blood vessel deviation threshold, it can be determined that the blood vessel has likely become sclerotic.

To determine whether a location of a blood vessel has been clotted, based on the received photoacoustic signals, similar to measuring glucose concentration in a blood vessel, an amount of blood at a location of a blood vessel may be measured in some embodiments to determine whether a clot likely exists at that location. For example, an amplitude of the received photoacoustic signals is compared to a normal blood vessel amplitude threshold, and in the event that the amplitude of the received photoacoustic signals is greater than or equal to the normal blood vessel amplitude threshold, it can be determined that the blood vessel likely has a clot at that location.

Figure 6:
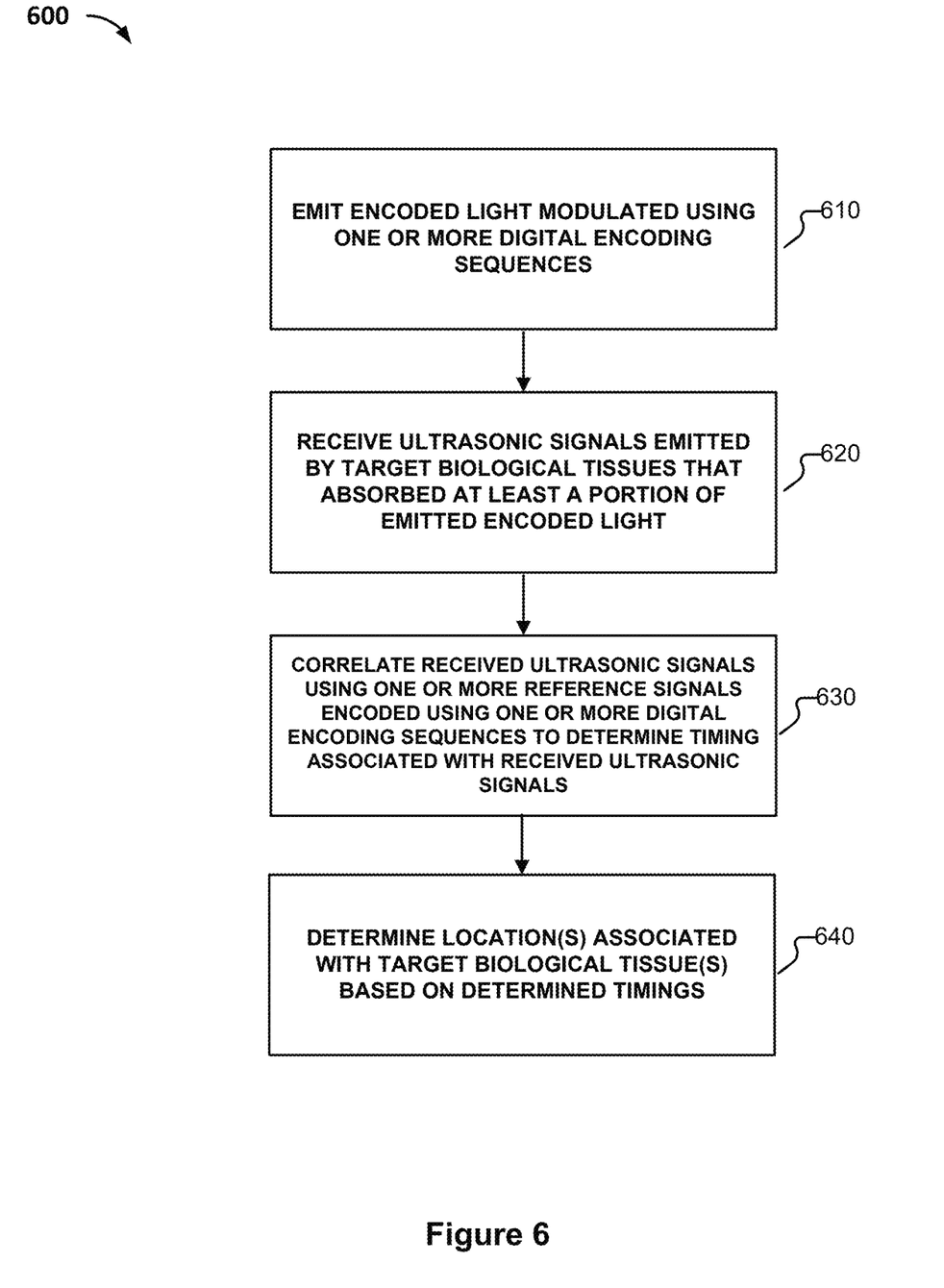
FIG. 6 is a flow chart illustrating an embodiment of a process for performing photoacoustic tomography.

FIG. 6 is a flow chart illustrating an embodiment of a process for performing photoacoustic tomography. In some embodiments, the process 600 is implemented using the device 500 of FIG. 5 and comprises:

In 610, using a plurality of light sources, encoded light modulated using one or more digital encoding sequences is emitted. For example, optical light sources emit pulses of light modulated using one or more digital encoding schemes (e.g., modulated using one or more different binary sequences such as pseudo-random binary sequence). In some embodiments, each optical light source located at different locations emits its encoded light into a tissue of a human subject. The different light signals emitted by the different optical light sources can be distinguishable from one another via timing differences (e.g., emitted at different times) and/or encoding sequence differences (e.g., encoded using different binary sequences).

In 620, using a plurality of receivers, ultrasonic signals emitted by target biological tissues that absorbed at least a portion of the emitted encoded light are received. The wavelength of the light is chosen such that the photons will extinguish and be absorbed on a specific target (e.g., 576 nm for oxygenated hemoglobin in blood to detect blood vessels). When the photons are absorbed, local heating occurs, causing rapid thermal expansion and contraction of the tissue. This thermal expansion and contraction causes an ultrasound pulse to launch from the point where the photon was absorbed, where a plurality of ultrasonic detector (e.g., receivers or sensors) outside of the tissue (e.g., on/facing skin) can detect/receive the photon. The encoded light travels almost instantaneously at light speed through the tissue to cause the target tissue to emit an ultrasonic signal that can be received at the receivers.

In 630, the received ultrasonic signals are correlated using one or more reference signals encoded using the one or more digital encoding sequences to determine timing associated with the received ultrasonic signals. The total amount of time from when the encoded light was transmitted to when the ultrasonic signal is received includes the amount of time it took for the ultrasonic signal to travel from the target to the receivers. In some embodiments, the amount of time it look for the light signal to reach the target and the amount of time it look for the target to absorb the light and emit the ultrasonic signal is negligible and ignored from the total amount of time, while in other embodiments, a time component associated with either or both of these is subtracted from the total amount of time from when the light signal was transmitted to when the ultrasonic signal is received to isolate the desired in tissue travel time of the ultrasonic signal. For each received ultrasonic signal of various receivers, the corresponding total amount of time from when the encoded light was transmitted to when the ultrasonic signal is received at the receiver can be determined by determining an amount of time from when the light signal encoded using a binary sequence was sent out to when in a received signal the encoded binary sequence is detected (e.g., when peak correlation between received signal and reference signal encoding the binary sequence) is detected. In some embodiments, the received ultrasonic signal at a receiver includes components of a plurality of distinguishable signals transmitted by different light transmitters and the received ultrasonic signal is separated into different received ultrasonic signals each corresponding to a different transmitted light signal of an optical light source for individual analysis by correlating the received signal with different reference signals of different encoding sequences.

In 640, location(s) associated with the target biological tissue(s) are determined based on the determined timings. The determined time-of-flight from the encoded light pulse to reception of the ultrasound signal can be used to compute the point of origination. For example, if the speed of a light signal traveling through the tissue is known, the distance traveled by the light signal can be calculated from a known travel time. With multiple receivers at known locations and determined distances to these receivers from an ultrasonic signal origination point of the target tissue, the exact physical location of the origination point (e.g., target tissue location) can be triangulated. In some embodiments, the entire sequence of ultrasound pulses can be then used to create an image of the tissue (e.g., in the case of oxygenated hemoglobin, an image of all of the blood vessels in the tissue).

Figure 7:
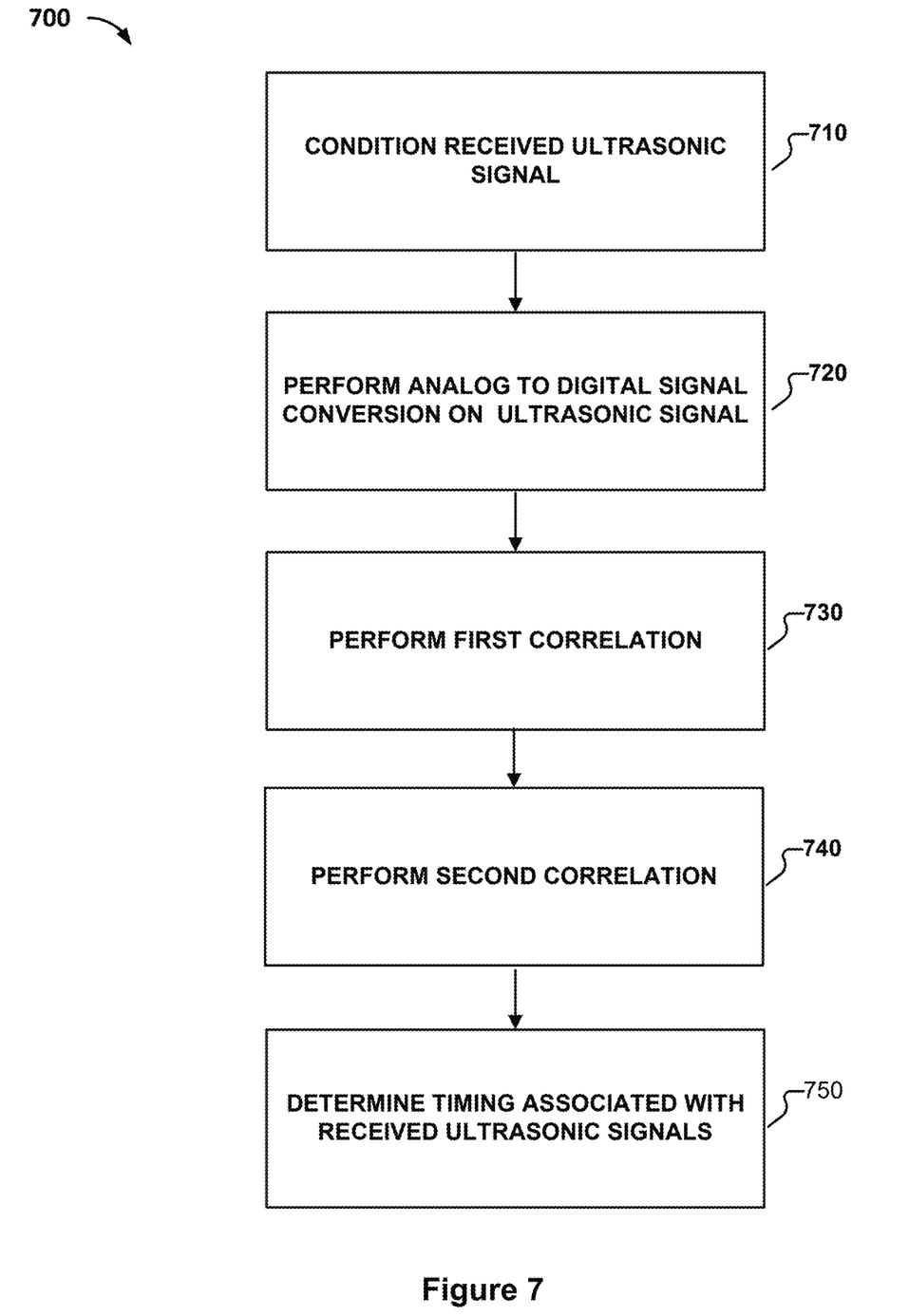
FIG. 7 is a flow chart illustrating an embodiment of a process for determining timing associated with received ultrasonic signals.

FIG. 7 is a flow chart illustrating an embodiment of a process for correlating received ultrasonic signals using one or more digital encoding sequences to determine timing associated with the received ultrasonic signals. In some embodiments, the process 700 is an implementation of operation 630 of FIG. 6 and comprises:

At 710, a received ultrasonic signal is conditioned. In some embodiments, the received ultrasonic signal is an ultrasonic signal emitted by target biological tissue in response to optical light absorbed by the target. The amplitude of the optical light is encoded using a binary sequence (e.g., a pseudorandom binary sequence) and the target biological tissue in response emits the ultrasonic signal in the binary sequence. For example, the received ultrasonic signal is an ultrasonic signal that has been received at 620 of FIG. 6. In some embodiments, conditioning the received ultrasonic signal includes filtering or otherwise modifying the received ultrasonic signal to improve signal quality (e.g., signal-to-noise ratio) for detection of a pseudorandom binary sequence included in the received ultrasonic signal.

In some embodiments, conditioning the received ultrasonic signal includes filtering out from the ultrasonic signal extraneous noise.

At 720, an analog to digital signal conversion is performed on the ultrasonic signal that has been conditioned at 710. In some embodiments, any number of standard analog to digital signal converters can be used.

At 730, a first correlation is performed using the resulting digital signal. In some embodiments, components of the received ultrasonic signal associated with different ultrasonic signals/transmitters are separated. For example, different ultrasonic signals emitted in response to different optical light sources (e.g., each of the different optical light sources emit optical light encoded using a different binary sequence) are isolated from each other via correlation. In some embodiments, performing the first correlation includes correlating at least a portion of the converted signal (e.g., signal component from a single transmitter) with a reference signal (e.g., corresponding binary sequence encoded reference signal emitted by the corresponding optical light source). Performing the correlation includes cross-correlating or determining a convolution (e.g., interferometry) of the converted signal with a reference signal to measure the similarity of the two signals, as a time-lag is applied to one of the signals. By performing the correlation, the location of a portion of the converted signal that most corresponds to the reference signal can be located. For example, a result of the correlation can be plotted as a graph of time within the received and converted ultrasonic signal (e.g., time-lag between the signals) vs. a measure of similarity. The associated time value of the largest value of the measure of similarity corresponds to the distance traveled by the ultrasonic signal from the blood vessel to the ultrasonic receiver. In some embodiments, by measuring the amplitude/intensity difference of the received signal at the determined time vs. a reference signal, blood vessels associated with the received ultrasonic signals can be determined. In some embodiments, the reference signal is determined based at least in part on the optical light signal that was absorbed by the target (e.g., based on a source pseudorandom binary sequence signal that was transmitted by the optical light source). The reference signal can be chosen so that calculations required to be performed during the correlation can be simplified. For example, the reference signal used in 730 is a simplified reference signal that can be used to efficiently correlate the reference signal over a relatively large time difference (e.g., lag-time) between the received and converted signal and the reference signal.

At 740, a second correlation is performed based on a result of the first correlation. Performing the second correlation includes correlating (e.g., cross-correlation or convolution similar to operation 730) at least a portion of the converted signal in 720 with a second reference signal. The second reference signal is a more complex/detailed (e.g., more computationally intensive) reference signal as compared to the first reference signal used in 730. In some embodiments, the second correlation is performed in 740 because using the second reference signal in 730 can be too computationally intensive for the time interval required to be correlated in 730. Performing the second correlation based on the result of the first correlation includes using one or more time values determined as a result of the first correlation. For example, using a result of the first correlation, a range of likely time values (e.g., time-lag) that most correlate between the received ultrasonic signal and the first reference signal is determined and the second correlation is performed using the second reference signal only across the determined range of time values to fine tune and determine the time value that most corresponds to where the second reference signal (and, by association, also the first reference signal) matched the received signal. In some embodiments, the first and second correlations have been used to determine a portion within the received signal that corresponds to an ultrasonic signal emitted by a blood vessel in response to the pseudo random binary sequence encoded optical light. In other embodiments, the second correlation is optional. For example, only a single correlation step is performed.

At 750, timing associated with received ultrasonic signals is determined based at least in part on a result of the second correlation.

Figure 8:
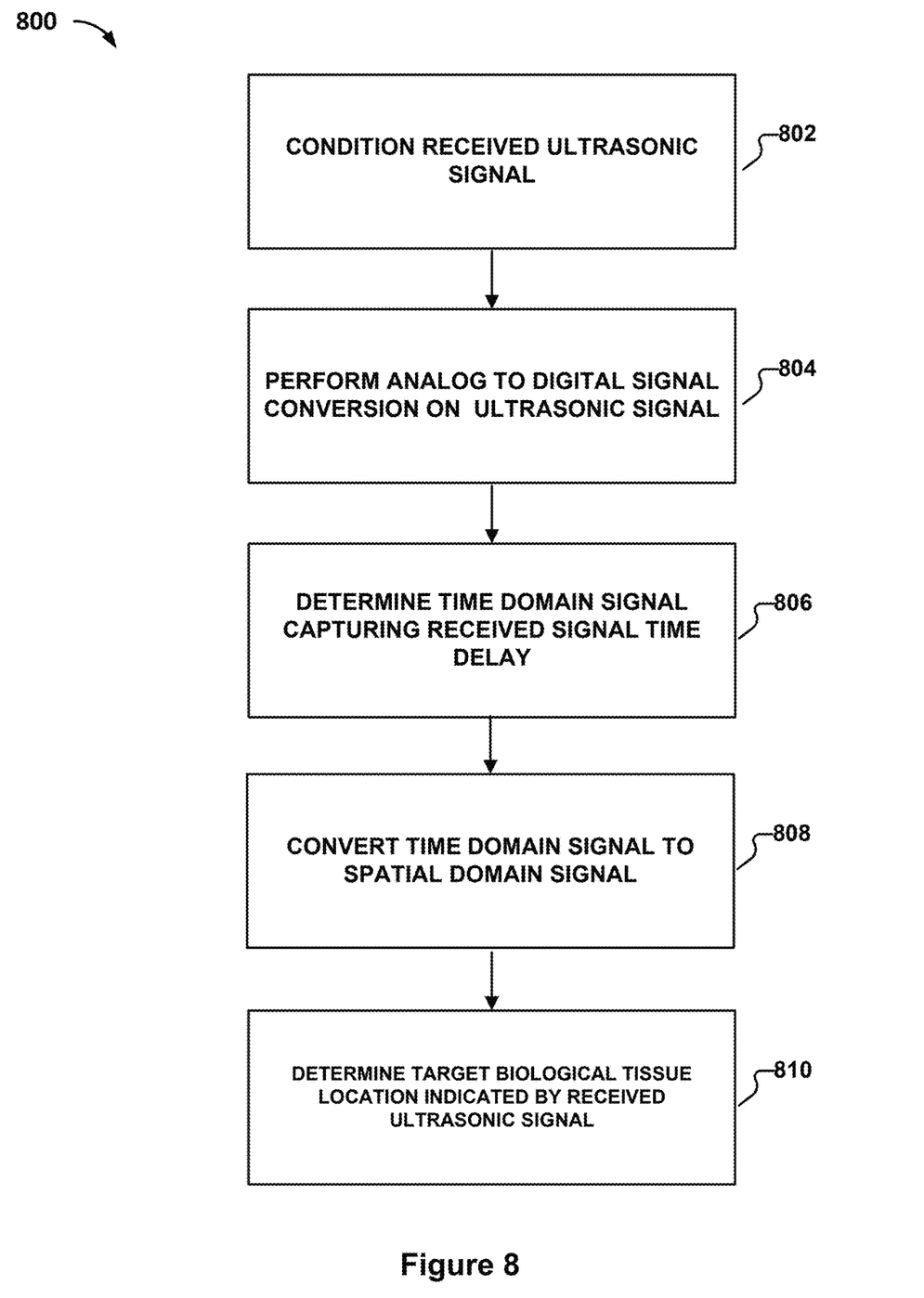
FIG. 8 is a flow chart illustrating an embodiment of a process for determining a location associated with a target biological tissue.

FIG. 8 is a flow chart illustrating an embodiment of a process for determining a location associated with a target biological tissue. In some embodiments, the process 800 of FIG. 8 is included in 640 of FIG. 6. In some embodiments, at least a portion of the process 800 of FIG. 8 is repeated for each combination of transmitter and sensor pair. For example, for each active signal transmitted by a transmitter (e.g., transmitted by transmitter 104, 106, 108, or 110 of FIG. 1), at least a portion of the process 800 of FIG. 8 is repeated for each sensor (e.g., sensors 112, 114, 116, and 118 of FIG. 1) receiving the active signal. In some embodiments, the process 800 of FIG. 8 is performed periodically (e.g., 5 ms periodic interval, based on the length of the digital encoding 610).

At 802, a received ultrasonic signal is conditioned. In some embodiments, the received ultrasonic signal is an ultrasonic signal emitted by target biological tissue in response to optical light absorbed by the target. The amplitude of the optical light is encoded using a binary sequence (e.g., a pseudorandom binary sequence) and the target biological tissue in response emits the ultrasonic signal in the binary sequence. For example, the received ultrasonic signal is an ultrasonic signal that has been received at 620 of FIG. 6. In some embodiments, conditioning the received ultrasonic signal includes filtering or otherwise modifying the received ultrasonic signal to improve signal quality (e.g., signal-to-noise ratio) for detection of a pseudorandom binary sequence included in the received ultrasonic signal. In some embodiments, conditioning the received ultrasonic signal includes filtering out from the ultrasonic signal extraneous noise.

At 804, an analog to digital signal conversion is performed on the ultrasonic signal that has been conditioned at 802. In various embodiments, any number of standard analog to digital signal converters may be used.

At 806, a time domain signal capturing a received signal time delay is determined. In some embodiments, determining the time domain signal includes correlating the received ultrasonic signal (e.g., signal resulting from 804) to locate a time offset in the converted signal (e.g., perform pseudorandom binary sequence deconvolution) where a signal portion that likely corresponds to a reference signal (e.g., reference pseudorandom binary sequence) is located. For example, a result of the correlation can be plotted as a graph of time within the received and converted signal (e.g., time-lag between the signals) vs. a measure of similarity. In some embodiments, performing the correlation includes performing a plurality of correlations. For example, a coarse correlation is first performed then a second level of fine correlation is performed. In some embodiments, a baseline signal is removed in the resulting time domain signal. For example, a baseline signal representing a measured signal (e.g., a baseline time domain signal) associated with a received ultrasonic signal is subtracted from a result of the correlation to further isolate effects of the received ultrasonic signal by removing components of the steady state baseline signal not affected by the received ultrasonic signal.

At 808, the time domain signal is converted to a spatial domain signal. In some embodiments, converting the time domain signal includes converting the time domain signal determined at 806 into a spatial domain signal that translates the time delay represented in the time domain signal to a distance traveled by the received ultrasonic signal in the target biological tissue. For example, a time domain signal that can be graphed as time within the received and converted signal vs. a measure of similarity is converted to a spatial domain signal that can be graphed as distance traveled in the target biological tissue vs. the measure of similarity.

In some embodiments, performing the conversion includes performing dispersion compensation. For example, using a dispersion curve characterizing the target biological tissue, time values of the time domain signal are translated to distance values in the spatial domain signal. In some embodiments, a resulting curve of the time domain signal representing a distance likely traveled by the received ultrasonic signal is narrower than the curve contained in the time domain signal representing the time delay from the target biological tissue. In some embodiments, the time domain signal is filtered using a match filter to reduce undesired noise in the signal. For example, using a template signal that represents an ideal shape of a spatial domain signal, the converted spatial domain signal is match filtered (e.g., spatial domain signal correlated with the template signal) to reduce noise not contained in the bandwidth of the template signal. The template signal may be predetermined by applying a sample light to a target biological tissue and measuring a received ultrasonic signal.

At 810, the spatial domain signal is used to determine a target biological tissue location indicated by the received ultrasonic signal. For example, a peak in the spatial domain signal directly corresponds to the distance traveled by the received ultrasonic signal from the target tissue.

Figure 9:
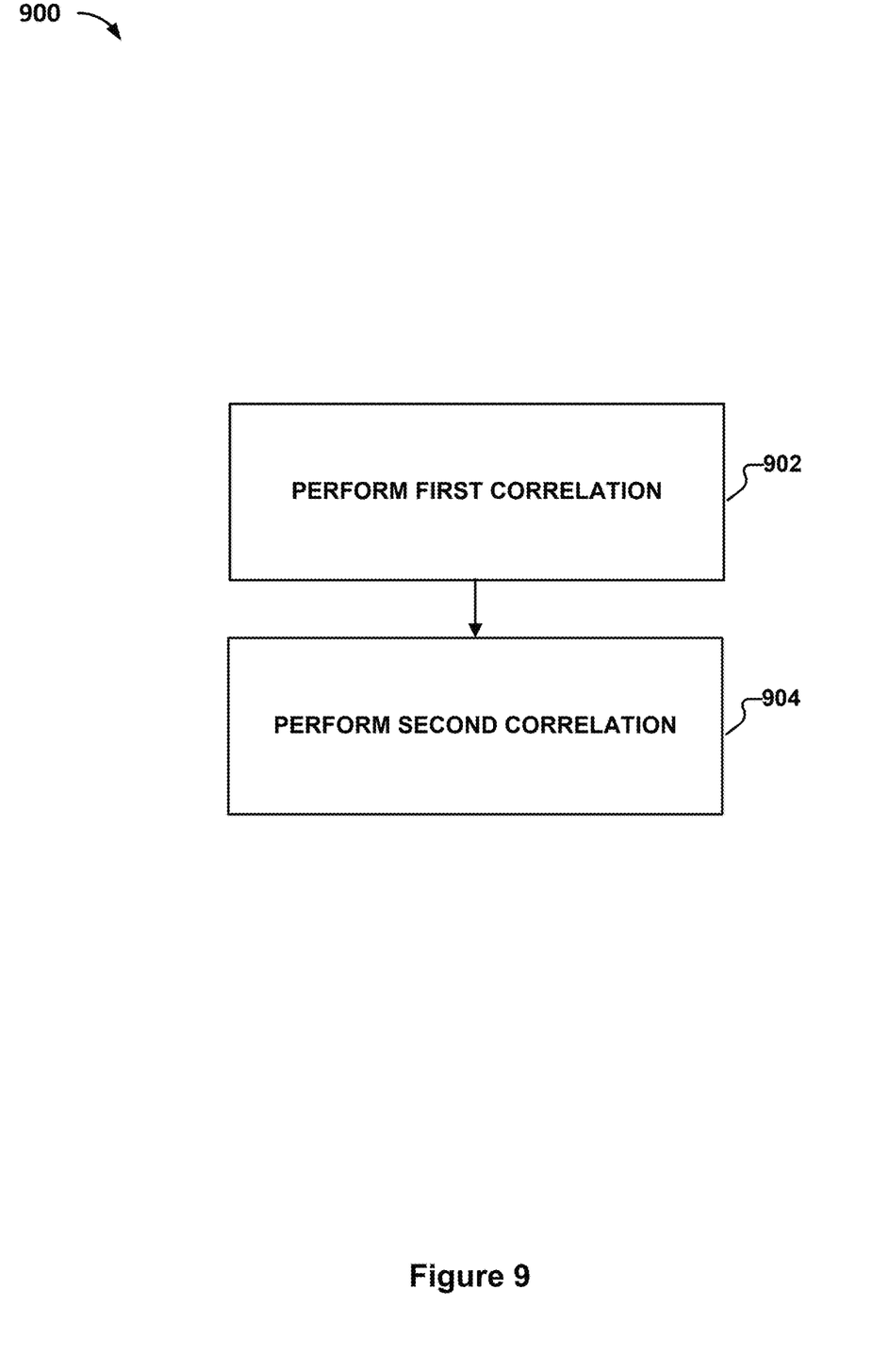
FIG. 9 is a flow chart illustrating an embodiment of a process for signal correlation.

FIG. 9 is a flow chart illustrating an embodiment of a process for signal correlation. In some embodiments, the process 900 of FIG. 9 is included in 806 of FIG. 8.

At 902, a first correlation is performed. In some embodiments, performing the first correlation includes correlating a received signal (e.g., resulting converted signal determined at 804 of FIG. 8) with a reference signal. Performing the correlation includes cross-correlating or determining a convolution (e.g., interferometry) of the converted signal with a reference signal to measure the similarity of the two signals as a time-lag is applied to one of the signals. By performing the correlation, the location of a portion of the converted signal that most corresponds to the reference signal can be located. For example, a result of the correlation can be plotted as a graph of time within the received and converted signal (e.g., time-lag between the signals) vs. a measure of similarity. The associated time value of the largest value of the measure of similarity corresponds to the location where the two signals most correspond. By comparing this measured time value against a reference time value not associated with a received ultrasonic signal, a time delay/offset or phase difference caused on the received signal due to a received ultrasonic signal can be determined. In some embodiments, the reference signal is determined based at least in part on the signal that was propagated through a target biological tissue (e.g., based on a source pseudorandom binary sequence signal that was propagated). In some embodiments, the reference signal is at least in part determined using information determined during calibration. The reference signal may be chosen so that calculations required to be performed during the correlation may be simplified. For example, the reference signal is a simplified reference signal that can be used to efficiently correlate the reference signal over a relatively large time difference (e.g., lag-time) between the received and converted signal and the reference signal.

At 904, a second correlation is performed based on a result of the first correlation. Performing the second correlation includes correlating (e.g., cross-correlation or convolution similar to step 902) a received signal (e.g., resulting converted signal determined at 804 of FIG. 8) with a second reference signal. The second reference signal is a more complex/detailed (e.g., more computationally intensive) reference signal as compared to the first reference signal used in 902. In some embodiments, the second correlation is performed because using the second reference signal in 902 may be too computationally intensive for the time interval required to be correlated in 902. Performing the second correlation based on the result of the first correlation includes using one or more time values determined as a result of the first correlation. For example, using a result of the first correlation, a range of likely time values (e.g., time-lag) that most correlate between the received signal and the first reference signal is determined and the second correlation is performed using the second reference signal only across the determined range of time values to fine tune and determine the time value that most corresponds to where the second reference signal (and, by association, also the first reference signal) matched the received signal. In various embodiments, the first and second correlations have been used to determine a portion within the received signal that corresponds to light emissions absorbed by a target biological tissue. In other embodiments, the second correlation is optional. For example, only a single correlation step is performed. Any number of levels of correlations may be performed in other embodiments.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a plurality of light sources configured to emit encoded light signals modulated using digital encoding sequences, wherein at least two of the plurality of light sources emit corresponding different ones of the encoded light signals that are modulated to encode different binary sequences;
    a plurality of piezoelectric transducer receivers configured to receive ultrasonic signals emitted by target biological tissues that absorbed at least a portion of the emitted encoded light signals; and
    a processor configured to:
        correlate the received ultrasonic signals with a first reference signal encoded using a first of the different binary sequences to distinguish a first signal portion of the received ultrasonic signals, and correlate the received ultrasonic signals with a second reference signal encoded using a second of the different binary sequences to distinguish a second signal portion of the received ultrasonic signals, to thereby determine timing associated with the first portion and the second signal portion;
        determine locations associated with the target biological tissues based on the determined timing; and
        based on the determined locations, determine a medical property associated with the target biological tissues.

2. The system of claim 1, wherein the medical property includes blood pressure.

3. The system of claim 1, wherein:
    the encoded light signals have one or more wavelengths in a range of 1420-1480 and 1630-1730 nm; and
    the processor is further configured to determine glucose concentration of the target biological tissues based on the determined timing.

4. The system of claim 1, wherein the processor is further configured to determine a range of a diameter of a blood vessel of the target biological tissues based on the determined timing over a period of time.

5. The system of claim 4, wherein the processor is further configured to:
    determine blood pressure based on the determined range of the diameter of the blood vessel.

6. The system of claim 1, wherein the plurality of light sources includes a plurality of vertical-cavity surface-emitting lasers (VCSELs).

7. The system of claim 1, wherein the plurality of light sources includes a plurality of light emitting diodes (LEDs).

8. The system of claim 1, wherein the digital encoding sequences correspond to at least a pseudorandom binary sequence (PRBS).

9. The system of claim 1, wherein the plurality of receivers include a plurality of microphones.

10. The system of claim 1, wherein the timing corresponds to a time relating to a speed of sound traveling from a target biological tissue to a receiver of the plurality of receivers.

11. A method, comprising:
    emitting, using a plurality of light sources, encoded light signals modulated using digital encoding sequences, wherein at least two of the plurality of light sources emit corresponding different ones of the encoded light signals that are modulated to encode different binary sequences;
    receiving, using a plurality of piezoelectric transducer receivers, ultrasonic signals emitted by target biological tissues that absorbed at least a portion of the emitted encoded light signals;
    correlating, using a processor, the received ultrasonic signals with a first reference signal encoded using a first of the different binary sequences to distinguish a first signal portion of the received ultrasonic signals, and correlate the received ultrasonic signals with a second reference signal encoded using a second of the different binary sequences to distinguish a second signal portion of the received ultrasonic signals, to thereby determine timing associated with the first portion and the second signal portion;
    determining, using the processor, locations associated with the target biological tissues based on the determined timing; and
    based on the determined locations, determining a medical property associated with the target biological tissues.

12. The method of claim 11, wherein the medical property includes blood pressure.

13. The method of claim 11, wherein:
    the encoded light signals have one or more wavelengths in a range of 1420-1480 and 1630-1730 nm; and
    the method further comprises:

determining glucose concentration of the target biological tissues based on the determined timing.

14. The method of claim 11, further comprising:
determining a range of a diameter of a blood vessel of the target biological tissues based on the determined timing over a period of time.

15. The method of claim 14, further comprising:
determining blood pressure based on the determined range of the diameter of the blood vessel.

16. The method of claim 11, wherein the plurality of light sources includes a plurality of vertical-cavity surface-emitting lasers (VCSELs).

17. The method of claim 11, wherein the plurality of light sources includes a plurality of light emitting diodes (LEDs).

18. The method of claim 11, wherein the digital encoding sequences correspond to at least one a pseudorandom binary sequence (PRBS).

19. The method of claim 11, wherein the plurality of receivers include a plurality of microphones.

20. The method of claim 11, wherein the timing corresponds to a time relating to a speed of sound traveling from the target biological tissues to a receiver of the plurality of receivers.

* * * * *